United States Patent [19]
Baxi

[11] Patent Number: 5,198,238
[45] Date of Patent: Mar. 30, 1993

[54] APPARATUS HAVING AN IN-THE-MOLD GAS INJECTION PIN

[75] Inventor: Indra R. Baxi, Solon, Ohio

[73] Assignee: Nitrojection Corporation, Middlefield, Ohio

[21] Appl. No.: 701,122

[22] Filed: May 16, 1991

[51] Int. Cl.⁵ .......................................... B29C 45/76
[52] U.S. Cl. ................................. 425/130; 264/403; 264/572; 425/144; 425/145; 425/149; 425/564
[58] Field of Search ............... 425/562, 563, 564, 565, 425/566, 144, 145, 149; 264/572, 40.3

[56] References Cited

U.S. PATENT DOCUMENTS

| | | | |
|---|---|---|---|
| 3,716,318 | 2/1973 | Erik et al. | 425/563 |
| 4,208,176 | 6/1980 | Salerno | 425/144 |
| 4,632,652 | 12/1986 | Farrell | 425/170 |
| 4,740,150 | 4/1988 | Sayer | 425/562 |
| 5,037,285 | 8/1991 | Kudert et al. | 425/145 |
| 5,044,924 | 9/1991 | Loren . | |

Primary Examiner—Tim Heitbrink
Attorney, Agent, or Firm—Fay, Sharpe, Beall, Fagan, Minnich & McKee

[57] ABSTRACT

An apparatus for use in gas assisted injection molding of plastic material so as to form an injection molded product includes a pair of mold members defining when closed a sealed cavity. A first opening is provided in one of the mold members for allowing the injection of a plastic material into the cavity. A device is provided to supply a pressurized gas and a second opening is provided in one of the mold members for allowing the injection of the pressurized gas into the cavity. A probe is located in the second opening and is adapted to be reciprocated therein from a retracted position to an extended position. The probe has a first end adapted to selectively extend into the cavity, a second end, and a longitudinally extending bore which terminates in a port located adjacent the first end. The bore is used to guide the gas into the cavity. A device is provided for reciprocating the probe in relation to the cavity. A control system controls the operation of the device for reciprocating as well as the device for supplying a gas.

24 Claims, 6 Drawing Sheets

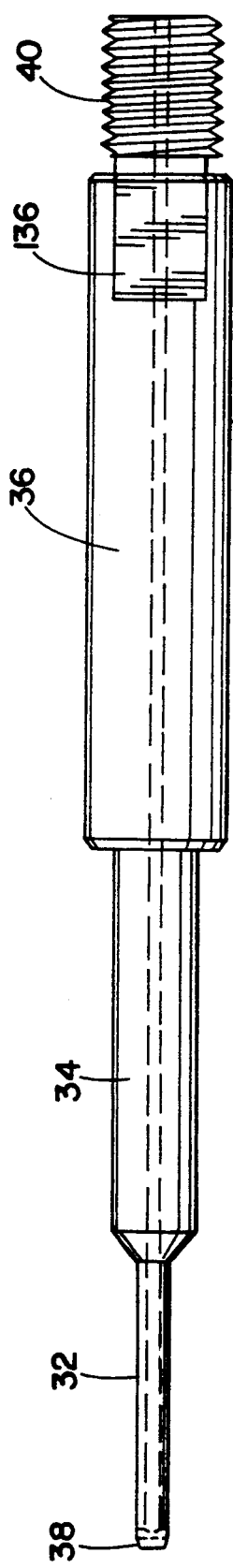
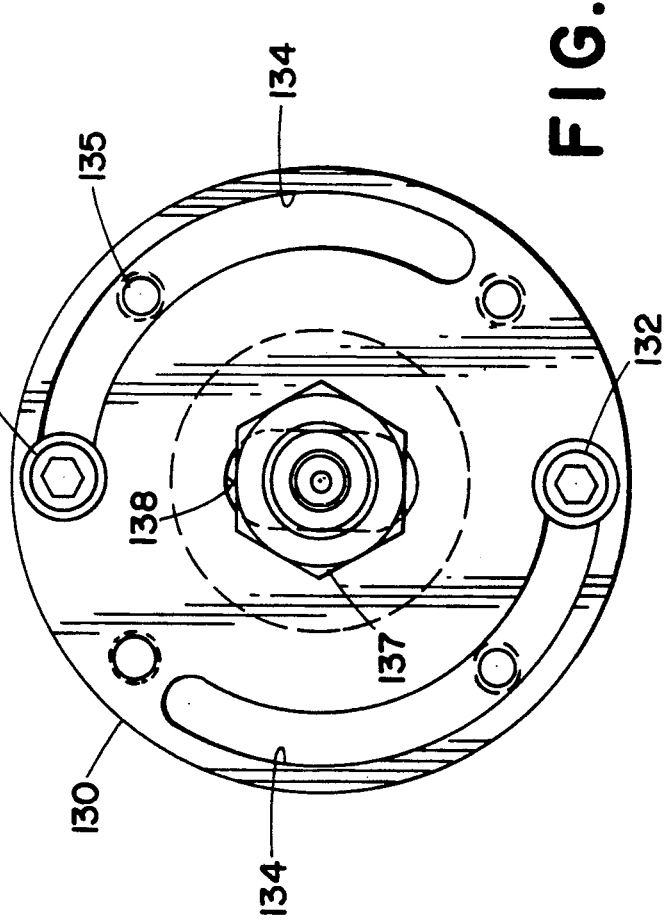
FIG. 2B
FIG. 2C

APPARATUS HAVING AN IN-THE-MOLD GAS INJECTION PIN

BACKGROUND OF THE INVENTION

This invention generally pertains to an injection molding apparatus. More specifically, the present invention relates to a gas injection pin for such an injection molding apparatus.

The invention is particularly applicable to a gas assisted injection molding process in which a nozzle is utilized to inject a viscous fluid such as a molten plastic into a mold cavity and a non-viscous fluid such as a gas is also injected into the mold cavity. However, it will be appreciated by those skilled in the art that the invention has broader applications and may also be adapted for use in many other injection molding environments where both a relatively viscous fluid, such as a plastic or wax, and a relatively non-viscous fluid such as a gas or liquid are injected into a mold cavity.

Injection molding processes have been widely known, not only for the production of molded articles made of various thermoplastic resins, but also for the production of lost wax masters used in the investment casting process.

One such known process is solid injection molding which employs the steps of injecting a plasticized (melted) thermoplastic material under high pressure into a finite mold space and then cooling the material sufficiently so that it rehardens to the extent that it can retain its shape after removal from the mold. Thermoplastic materials, generally shrink during rehardening and, unfortunately, this shrinkage is exaggerated in heavier wall sections, bosses, ribs, gussets, etc. This usually results in sink marks and warpage in the molded products.

Packing the mold with more material by pressing the plastic material at a higher pressure into the mold is a common technique used to minimize such excessive shrinkage. However, packing builds internal stresses into the part and often cannot remove sink marks that are located away from the injection molding sprue or gate. Additionally, packing requires high clamp pressures between the parts of the mold body in order to prevent flashing of the plastic material.

Certain proposals have recently been made to fill the mold cavity with a plasticized thermoplastic material to a volume less than one hundred percent (100%) of the mold space and to utilize an inert gas injected under pressure into the partially plasticized material as it is cooling and rehardening to fill the rest of the volume in the mold cavity. The gas enters the part and moves along the paths of least resistance therein. Such paths are normally in areas where the thermoplastic body is thicker and has slower cooling sections, such as ribs, flow channels, chamfers, etc. In this way, with a suitably designed part, a continuous network of hollowed out sections can be provided. The material displaced by the gas from the middle of the sections moves out to fill the remainder of the mold space. This network of gas channels provides a uniform pressure distribution system throughout the mold space during part rehardening and cool down, thus minimizing internal stresses. The outer surfaces of thicker sections do not sink because gas has cored them out from the inside and gas pressure holds the plastic material up against the mold surfaces during rehardening. Sink in these sections takes place internally rather than on the exterior surfaces of the part. Since the pressure used for final filling of the part is confined to an area defined by the gas channels, the resultant force against the sections of the mold is relatively modest so that lower clamping forces on the mold are adequate.

Most of the nozzles which are adapted to inject both a viscous fluid such as a thermoplastic material and a non-viscous fluid such as a gas into a mold cavity inject both of these fluids through a common nozzle. However, for the production of some moldings, especially moldings of a complex design, it is desirable to introduce the pressurized gas or other relatively non-viscous fluid at a different location than at which the plastic is introduced, or perhaps at several locations which are all spaced from the plastic injection point. Such a situation may arise, for example when it is desired to employ a hot runner system or the choice of gate positions is restricted by the desire to avoid an overabundance of gas channels which need to be connected to one another so that the injection of gas at one point will enable the gas to push the plastic out against the surfaces of the mold cavity throughout the extent of the mold cavity.

Accordingly, it has been considered desirable to develop a new and improved injection molding nozzle which would overcome the foregoing difficulties and others while providing better and more advantageous overall results.

BRIEF SUMMARY OF THE INVENTION

In accordance with the present invention, a new and improved apparatus is provided for use in gas assisted injection molding of plastic materials so as to form an injection molded product.

More specifically in accordance with this aspect of the invention, the apparatus comprises a pair of mold members defining when closed a sealed cavity. A first opening is provided in one of the mold members for allowing the injection of a plastic material into the cavity. A means is provided for supplying a pressurized gas and a second opening is provided on one of the mold members for allowing the injection of the pressurized gas into the cavity. A probe is located in the second opening and is adapted to be reciprocated therein from a retracted position to an extended position. The probe comprises a first end adapted to selectively extend into the cavity, a second end and a longitudinally extending bore which terminates in a port located adjacent the first end, the bore being used to guide the gas into the cavity. A means is provided for reciprocating the probe in relation to the cavity and a control means is provided for controlling the operation of the means for reciprocating and the means for supplying gas.

In accordance with another aspect of the present invention, an injection molding apparatus is provided.

More particularly in accordance with this aspect of the invention, the apparatus comprises a pair of mold member defining when closed a sealed cavity and a first opening is provided in one of the mold members for allowing the injection of a relatively viscous material into the cavity. A second opening is provided in one of the mold members and is spaced from the first opening. A probe is located in the second opening and is adapted to be reciprocated therein from a first retracted position to a second extended position. The probe comprises a first end which selectively extends into the cavity when the probe is in the second position, a second end and a longitudinally extending bore which terminates in a port adjacent the first end. The bore is selectively used when the probe is in the second position for the injection of a relatively non-viscous fluid into the cavity and the subsequent venting of the fluid from the cavity. A means is provided for supplying the relatively non-viscous fluid to the probe bore. A piston and cylinder construction reciprocates the probe in the second opening in relation to the cavity. A means for sensing a position of the piston is provided wherein the means for supplying is activated only after the piston has been sensed.

In accordance with still another aspect of the present invention, an apparatus is provided for producing a fluid assisted injection molded product of a relatively viscous material such as plastic.

In accordance with this aspect of the invention, the apparatus comprises a mold space and a first passage opening into the mold space for introducing a relatively viscous material into the mold space. A second passage opens into the mold space and is spaced from the first passage for introducing a pressurized relatively non-viscous fluid into the relatively viscous material in the mold space so that a fluid cavity is formed in the viscous material. A probe extends into the second passage and is adapted to be reciprocated therein. The probe comprises a first end including a port, a second end and a longitudinally extending bore through which the relatively non-viscous fluid is adapted to flow, said bore communicating with said port. A programmable means is provided for supplying the pressurized fluid to the mold space through the longitudinally extending bore in the probe and a means is provided for reciprocating the probe in the second passage. A programmable means is also provided for controlling the means for supplying and the means for reciprocating.

According to still another aspect of the invention, a process is provided for producing an injection molded product.

The process includes the steps of introducing an amount of a molten relatively viscous material sufficient for the preparation of the injection molded product into a mold cavity at a first location and providing a probe having a tip with a port therein and a fluid channel extending therethrough and communicating with the port at a second location in relation to the mold cavity. The probe is adapted to reciprocate in relation to the mold cavity. The tip of the probe is then extended into the mold cavity. A movement of the probe is sensed and subsequently a quantity of a relatively non-viscous fluid is introduced into the mold cavity through the probe port thereby forming a fluid cavity in the molten material.

One advantage of the present invention is the provision of a new and improved apparatus for use in injection molding.

Another advantage of the present invention is the provision of an apparatus in which a relatively viscous material such as a plastic is introduced at a first location into a mold cavity and a relatively non-viscous fluid such as a gas is introduced at a second location which is preferably spaced from the first location.

Still another advantage of the present invention is the provision of a fluid assisted injection molding apparatus which utilizes a probe that reciprocates so as to selectively allow a flow of fluid into and out of a mold cavity.

Yet another advantage of the present invention is the provision of a gas assisted injection molding apparatus utilizing a reciprocating probe in which a gas injection port is located only on one side face of the probe.

Still yet another advantage of the present invention is the provision of a gas assisted injection molding apparatus in which a control means, preferably in the form of a programmable microprocessor, is utilized for controlling the operation of a means for reciprocating the probe as well as a means for supplying a gas to the probe.

A further advantage of the present invention is the provision of a gas assisted injection molding apparatus which utilizes a temperature sensor or a pressure sensor, or both, for measuring a temperature or a pressure, or both, in a mold cavity and this information is fed to a microprocessor which controls the operation of a gas injection and venting probe.

A still further advantage of the present invention is the provision of a process for producing the injection molded product in which a probe is selectively extended into a mold cavity and a quantity of a relatively non-viscous fluid such as a gas is only introduced through the probe into the cavity upon a sensing of a movement of the probe. Preferably, the probe is also used to vent the gas.

A yet further advantage of the present invention is the provision of a gas assisted injection molding apparatus in which a piston is utilized to reciprocate a gas injection probe and in which a sensor is utilized to sense a location of the piston. Only when the piston is sensed is pressurized gas introduced through the probe into the mold cavity.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 2B is an enlarged side elevational view of a probe of the molding apparatus of FIG. 2A;

FIG. 2C is an end elevational view of the molding apparatus of FIG. 2A;

DETAILED DESCRIPTION OF PREFERRED AND ALTERNATE EMBODIMENTS

Figure 1:
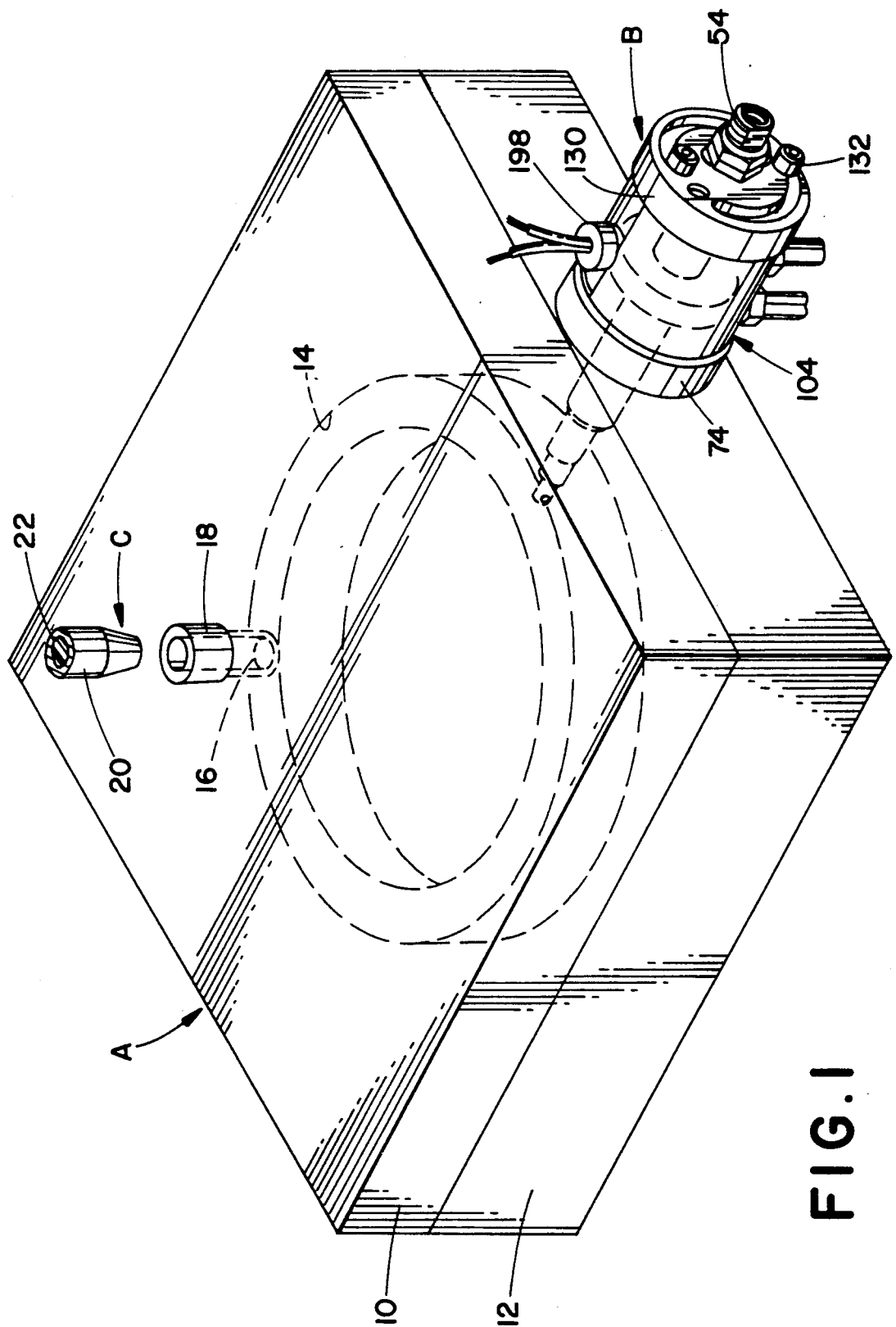
FIG. 1 is a schematic perspective view of a gas assisted injection molding apparatus and a mold according to the preferred embodiment of the present invention.

Referring now to the drawings, wherein the showings are for purposes of illustrating preferred and alternate embodiments of the invention only and not for purposes of limiting same, FIG. 1 shows the subject new gas assisted injection molding apparatus which includes a mold body A, a gas injection assembly B and a plastic injection assembly C. While the injection molding apparatus of FIG. 1 is primarily designed for and will hereinafter be described in connection with a gas assisted injection molding process utilizing thermoplastic material, it should be appreciated that the apparatus can also be used in various other molding environments in which both a relatively viscous fluid and a relatively non-viscous fluid are injected, such as for the production of lost wax masters and the like.

The apparatus preferably comprises a mold body A which includes a first mold half 10 and mating therewith a second mold half 12. As is conventionally known, the mold halves are selectively secured together by a conventional clamping assembly, not illustrated for the sake of simplicity. Defined between the mold halves 10 and 12 is a mold cavity 14. Communicating with the mold cavity and extending to an outer edge of the first mold half 10 through a suitable aperture 16 is a sprue body 18. Adapted to selectively engage the sprue 18 is the plastic injection assembly C. This comprises a nozzle 20 which mates with the sprue body and allows a molten thermoplastic material, as at 22, to flow through the sprue body and thence into the mold cavity 14.

Figure 2A:
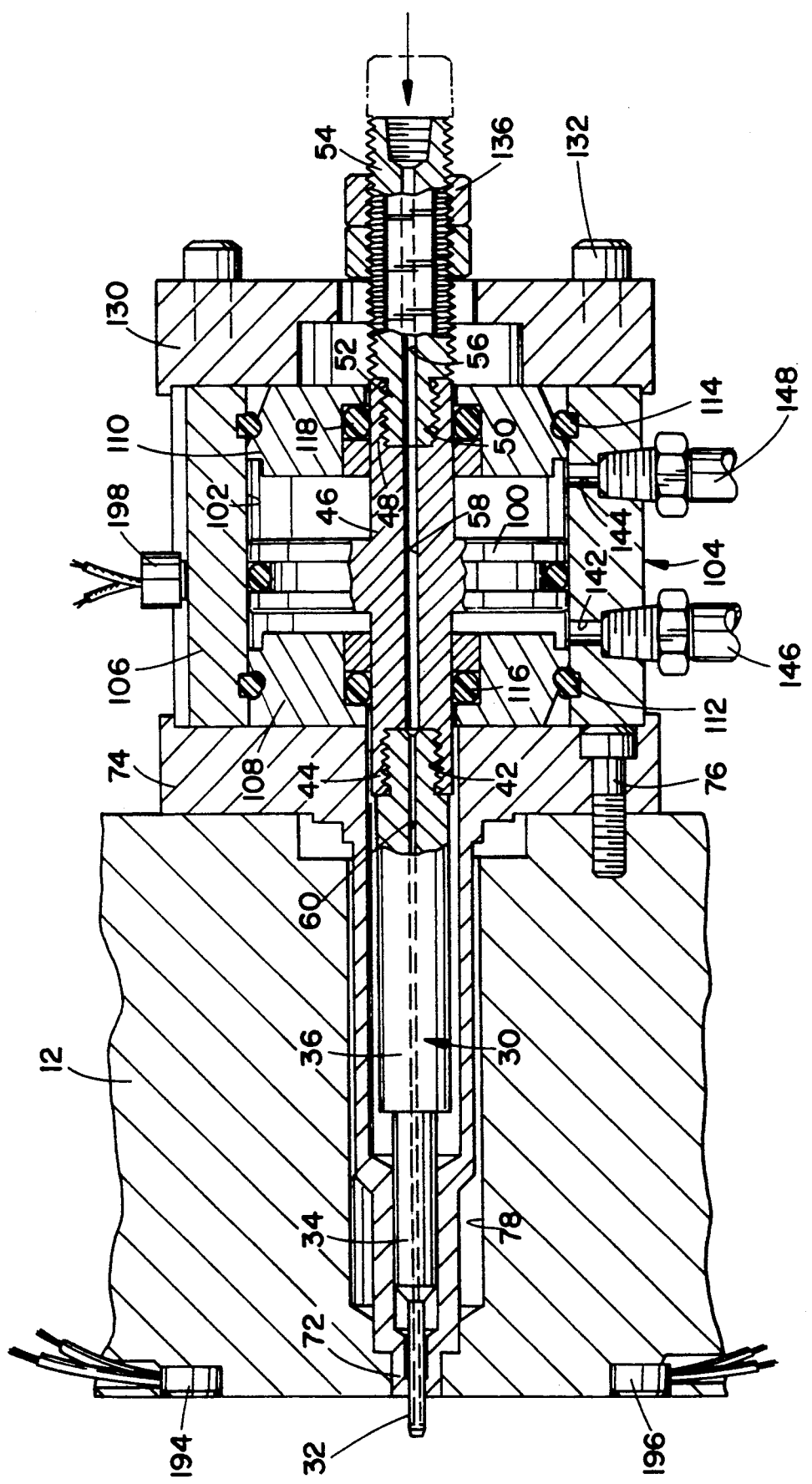
FIG. 2A is an enlarged side elevational view partially in cross-section of the gas assisted injection molding apparatus and the adjacent portion of the mold of FIG. 1.

With reference now also to FIG. 2A, extending in the second mold half 12 is a probe or pin 30 of the gas injection assembly. The pin 30 has a first end 32 of a first diameter, a central portion 34 of a larger second diameter and a second end 36 of a yet larger third diameter. As best shown in FIG. 2B, the first end has a flat front surface which is perpendicular to the longitudinal axis of the pin 30 in order to avoid material hangup at the pin tip. This could create ejection problems when attempting to eject the injection molded product from the mold cavity and may even break the injection molded product itself upon its ejection from the mold cavity. However, the pin can have a slight edge taper as illustrated at 38 in FIG. 2B. A complete taper or pointed front end is not recommended for producing acceptable products. A pointed pin tip is considered to be objectionable when the gas pin mechanism is located at a parting line between the mold halves, that is, perpendicular to the direction of the die draw. A pointed pin may also cause quality problems in the component produced when multiple pins are required in different planes for the manufacture of the gas assisted injection molded product. The edge taper or bevel can be on the order of 0.005 inches in width on the edges of the pin and on the order of 0.020 inches in length or depth from the flat front surface of the pin.

Provided on the second end is a threaded stem 40 which is adapted to be secured in a suitably threaded aperture 42 located on a first end 44 of a piston rod 46. Located on a second end 48 of the piston rod 46 is a second aperture 50 which is suitably threaded so as to receive a threaded stem 52 of a coupling member 54. Extending longitudinally through the coupling 54 is a bore 56 which communicates with a longitudinally extending bore 58 through the piston rod 46. The bore 58 communicates with a bore 60 that extends longitudinally through the pin 30 from its second end 36 to its first end 32 where it terminates in a cross bore 62 that can perhaps best be seen in FIG. 4, the cross bore terminates in a pair of oppositely located ports 64. It should also be noted that the diameter of the bore 60 is preferably somewhat smaller than the diameter of the bores 58 and 56 as is evident in FIG. 2A. The cross bore 62 and ports 64 can be of the same diameter as the bore 60, if desired.

Accommodating the pin 30 is a sleeve 70 that is suitably sized so as to allow the pin 30 to reciprocate therein. The sleeve 70 has a first end 72 which is located at the surface of the mold cavity 14 as shown in FIG. 2A. A second end 74 of the sleeve is flanged, extends outside the mold half 12 and is suitably secured thereto by, e.g., fasteners 76. Accommodating the sleeve 70 in the mold half 12 is a suitable multi-diameter bore 78 extending through the mold half.

Figure 3:
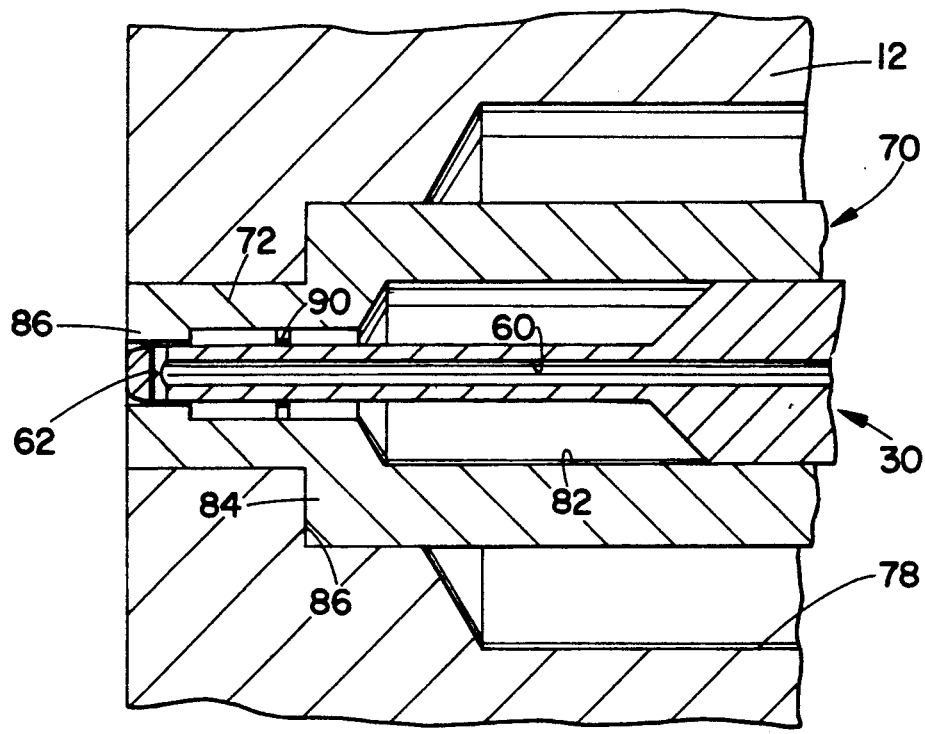
FIG. 3 is an enlarged cross-sectional view of a first end of the apparatus of FIG. 2A in a retracted position.
Figure 4:
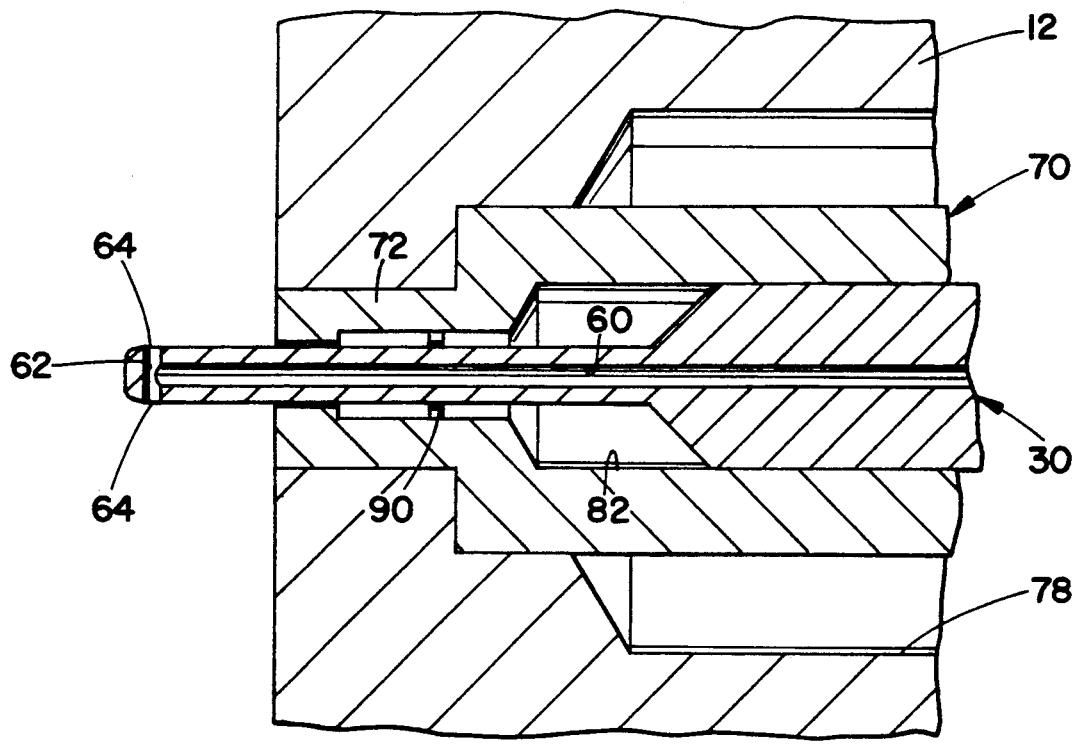
FIG. 4 is an enlarged cross-sectional view of a first end of the probe of FIG. 2A in an extended position.

With reference now to FIG. 3, it can be seen that adjacent the upper or first end 72 thereof, the sleeve 70 has a reduced diameter section 80 which serves as a seal means to prevent the flow of fluid into and out of the ports 64 when the pin 30 is retracted into the sleeve upper end 72. The section 80 is preferably coated with a low friction material to ease the reciprocating motion of the pin 30 in the bore of the sleeve. For example, the section 80 can have a diameter on the order of 15/1000ths of an inch smaller than a bore 82 extending longitudinally through the sleeve and may have a nitrited wear surface for resistance to abrasion. Due to the cooperation of a sleeve flange 84 with a shoulder 86 in the mold aperture 78, the sleeve does not move upwardly as the pin 30 enters the mold cavity 14 to expose the ports 64, as shown in FIG. 4. The stroke of the pin 30, i.e., its movement between its location in FIGS. 3 and 4, can be of the order of approximately ½ to 1½ inches. If desired, a spider 90 can be held in the sleeve bore 82 to steady the pin 30 as is reciprocates.

In order to allow a reciprocating motion of the pin 30 in the sleeve 70, a piston and cylinder assembly is provided. With reference again to FIG. 2A, the assembly includes the piston rod 46 previously mentioned. Fastened to the piston rod 46, or integral therewith as illustrated, is a suitable piston 100. The piston 100 reciprocates in a chamber 102 of a cylinder 104 having a side wall 106 and first and second end walls 108 and 110. Securing the first and second end walls 108 and 110 to the side wall 106 are suitable respective seals 112 and 114. Each of these seals is so shaped that a portion thereof can extend into a respective groove provided in the side wall and a corresponding groove provided in one of the end walls so as to retain the end walls in the correct location in relation to the side walls. In order to prevent fluid leakage along the piston rod 46, suitable inner seals 116 and 118 are also provided in the respective end walls 108 and 110. This type of cylinder construction is available from Compact Air Products Inc. of Westminster, S.C.

Located adjacent the second end wall 110 is an end cap 130 which also encloses the side wall 106. Suitable fasteners 132 extend through the end cap 130 and through the side wall 106 and into the flange second end 74 of the sleeve 70. In this way, the cylinder 104 is secured to the second mold half 12. Semicircular slots 134, as best illustrated in FIG. 2C are provided to allow the fastener 132 to extend through the end cap 130 and into a selected bore 135 of the sidewall 106. These slots enable the rotation of the end cap 130, and hence, the pin 30 in relation to the cylinder 104, and hence the mold body 12, to a desired degree. Such rotation can be on the order of almost 180°. This type of rotation is advantageous in order to assure that the pin ports 64 are located in the correct direction in relation to the mold cavity 14.

The location of the ports 64 may become important depending upon the direction of molten thermoplastic flow into the mold cavity 14 through the plastic injection assembly C as illustrated in FIG. 1. In other words, it would be disadvantageous to allow the gas to flow ahead of the plastic rather than into the plastic and the location of the ports 64 on the pin 30 may become important in this connection. In order to secure the pin 30 in the correct direction in relation to the mold body half 12 so that the pin cannot rotate, flats 136 are provided on the pin 30 as shown in FIG. 2B. In order to control the stroke of the pin 30, the coupling 54 is suitably secured to the end cap 130 by one or more nuts 137. In this connection, the coupling 54 extends through an oval aperture 138 through the end cap 130 as shown in FIG. 2C.

As shown in FIG. 2A, suitable bores 142 and 144 extend through the cylinder side wall 106 to enable the communication of pressurized fluid to either side of the piston 100 through conventional fittings 146 and 148.

Figure 5:
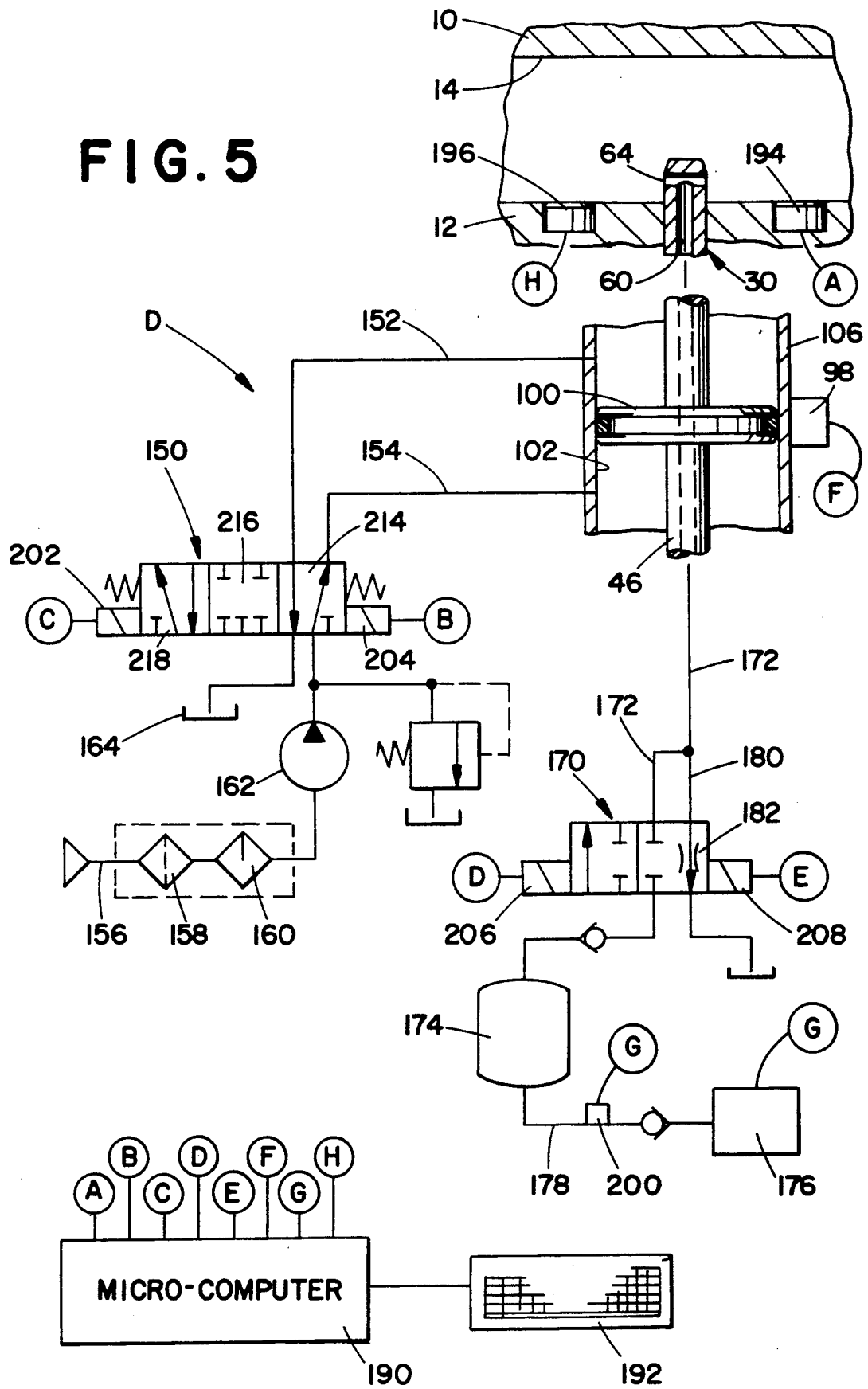
FIG. 5 is a hydraulic circuit diagram illustrating the use of the probe of FIG. 2B and a control mechanism therefor.

With reference now to FIG. 5, a control circuit D is provided for controlling the operation of the gas injection pin 30. Included in the control circuit D is a first valve 150 which selectively allows a flow of pressurized fluid, which may be shop air or the like, to either side of the piston 100 through respective fluid lines 152 and 154. The lines 152 and 154 lead to the first and second fittings 146 and 148 that are illustrated in FIG. 2A. As is conventional, shop air would enter through a third line 156, pass through a filter 158 and a lubricator 160 and be pressurized by a pump 162 and then, as controlled by the valve 150, enter one of the lines 152 or 154. The other line would at this time be vented to a sump 164 as is well known. If desired, the first valve 150 can be a three way five position valve which can be solenoid actuated to either end position and be spring biased to a center off position.

Also provided for this circuit is a second valve 170 which selectively allows the flow of a pressurized gas such as nitrogen gas or a similar suitable relatively non-viscous fluid into the mold cavity 14 through the pin 30. It should be recognized that the fluid could be a liquid and does not necessarily have to be gas although it is preferably a neutral gas such as nitrogen or carbon dioxide. The flow takes place through a line 172 which communicates with the bore 58 extending through the piston rod 46 and hence with the bore 60 extending through the pin 30. The pressurized gas or similar fluid flows from a suitable prepressurized chamber or storage chamber 174 as allowed by the selective actuation of the valve 170. For filling the chamber 174 a suitable pump assembly 176 is schematically illustrated in block diagram form in FIG. 5. As is conventional, check valves are provided in a line 178 which connects the pump assembly 176 with the prepressurized chamber 174 and thence the second valve 170. For venting the gas or similar fluid from the mold cavity 14, a sixth line 180 is provided which communicates with the fourth line 172 as shown. Upon a suitable activation of the second valve 170, the sixth line 180 allows the venting of the gas from the chamber 14 through a second envelope of the valve 170. As is shown, a metering orifice 182 is preferably provided in the second envelope of the valve 170 since it is often desirable to control the rate of venting of the gas from the cavity 14. The gas can be vented to a suitable sump as illustrated or can be recycled.

In order to control the activation of the pin 30 and the flow of the gas therethrough, preferably a suitable microcomputer 190 is provided. This microcomputer can advantageously be programmed by use of the keyboard 192 as is illustrated. In order to enable the microcomputer 190 to control the several activation stages inherent in the reciprocation of the pin 30, the microcomputer has several inputs and several outputs. A first of the inputs is a probe 194 which may be a temperature probe such as a thermocouple that is in communication with the mold cavity 14 as shown in FIG. 5 and as also shown in FIG. 2A. The output of this temperature probe is used as an input for the microcomputer. Preferably also provided is a pressure transducer probe 196 that is again in communication with the mold chamber as is shown in FIGS. 5 and 2A.

It should be recognized that under some circumstances either of these probes individually would be adequate to provide the information necessary for the microcomputer and that operation of the system can take place without either probe if that is desired. Another input for the microcomputer is a suitable magnetic sensor 198, such as the known Hall effect sensor which is located adjacent the chamber 102 in which the piston 100 reciprocates as shown in FIGS. 5 and 2A. This sensor is used to sense the presence of the piston 100. Advantageously, as shown in FIGS. 1 and 2A, the sensor can be slid in a track in the cylinder side wall 106 to correctly locate the sensor. Finally, a pressure sensor 200 is preferably provided in the fifth line 178 adjacent the prepressurized chamber 174 in order to provide the microcomputer with information concerning the pressure of the gas or other suitable fluid held in the chamber 174. If desired, the only inputs to the microcomputer can be the Hall effect sensor 198 and the pressure sensor 200.

Serving as outputs for the microcomputer are the solenoid elements which serve to reciprocate the first and second valves 150 and 170. In this regard, first and second solenoids 202 and 204 are provided on either end of the first valve 150 and third and fourth solenoids 206 and 208 are provided on either end of the second valve 170. Activation of the respective solenoids enable a selective movement of the first and second valves 150 and 170 as directed by the microcomputer 190.

In operation, the microcomputer would first actuate the second solenoid 204 and connect a first envelope 214 of the valve 150 to allow pressurized fluid to flow from the pump 162 through the second line 154 and into the chamber 102 behind the piston 100. This will move the piston upwardly in FIG. 5 and push the pin 30 into the mold cavity 14. When proximity of the piston 100 is sensed by the Hall effect magnetic sensor 198, the microcomputer will activate the third solenoid 206 and enable a communication of the pressurized fluid from the chamber 174 through the line 172 and the respective bores 58 and 60 and out through the ports 64. When the pin 30 is at the end of its stroke, the solenoid 204 is deactivated and the springs will center the first valve 150 on its center envelope 216 thereby preventing any further fluid flow through the lines 152 and 154. The pin 30 is thus held in an extended position in the mold cavity as is illustrated in FIGS. 4, 5 and 2A. Gas can at this time flow through the line 172 and into the mold cavity 14.

When it is desired to vent the pressurized fluid held in a fluid cavity formed in the thermoplastic in the chamber 14, this is done through line 172 and line 180 past the metering orifice 182 and to a suitable sump if desired. For this purpose, the microcomputer 190 will activate solenoid 208 of valve 170. Thereafter, in order to pull the pin 30 back out of the mold cavity 14, the first solenoid 202 is activated so as to allow a second envelope 218 of the first valve 150 to communicate with the lines 152 and 154. When so positioned, the pump 162 will deliver pressurized fluid through line 152 to the chamber 102 in front of the piston 100 thereby urging the piston downwardly and retracting the pin 30 from the mold cavity 14. After the pin 30 has been retracted from the mold cavity, as is illustrated in FIG. 3, the mold body A can be opened to remove the injection molded product and the entire process can then be repeated.

Figures 6A, 6B:
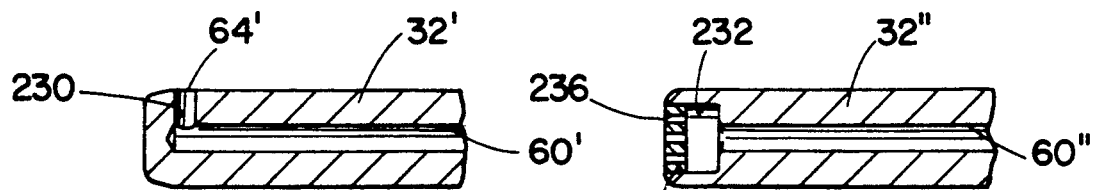
FIG. 6A is an enlarged cross-sectional view of a first end of a probe according to a first alternate embodiment.
FIG. 6B is an enlarged cross-sectional view of a probe first end according to a second alternate embodiment.
Figure 6C:
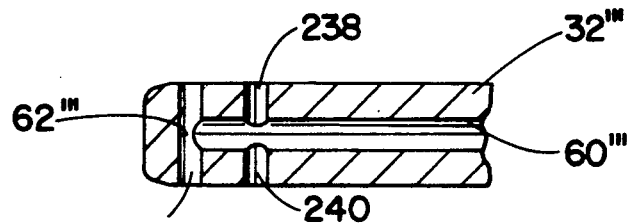
FIG. 6C is an enlarged cross-sectional view of a probe first end according to a third alternate embodiment.

With reference now to FIGS. 6A–6C, several alternate embodiments of the pin first end are there illustrated. For ease of illustration and comprehension of the alternative of FIG. 6A, like components are identified by like numerals with a primed suffix and new components are identified by new numerals.

In this embodiment, a pin first end 32' includes a longitudinally extending bore 60' which terminates in a bore 230 that extends out only one side of the pin and terminates in a port 64'. This type of embodiment would be advantageous in a situation where it is desirable to direct the flow of gas in only one direction out of the pin and hence in only one direction into the mold cavity.

With reference now to FIG. 6B, a second alternate embodiment of the pin is there illustrated. For ease of illustration and comprehension of this alternative, like components are identified by like numerals with a double primed suffix (″) and new components are identified by new numerals.

In this embodiment, a pin first end 32″ includes a longitudinally extending bore 60″ which terminates in an enlarged end bore 232. A suitable disc shaped member 234 closes the end bore 232. Preferably a plurality of small diameter longitudinally extending bores 236 are provided in the disc shaped member 234. The total opening area provided by the several bores 236 in the disc shaped member 234 preferably are equal to the opening area of the bore 60″. This embodiment is useful in a situation where one finds it desirable to provide several small bores 236 instead of a larger port such as in FIG. 6A.

With reference now to FIG. 6C, a third alternate embodiment of a pin is there illustrated. For ease of illustration and comprehension of this alternative, like components are identified by like numerals with a triple primed suffix (‴) and new components are identified by new numerals.

In this embodiment, a pin first end 32‴ is provided with a longitudinally extending bore 60‴ which terminates in a first cross bore 62″ as well as a second cross bore 238. The first cross bore has at its ends suitable ports 64‴. Similarly, the second cross bore 238 terminates in suitable ports 240. The embodiment of FIG. 6C may be advantageous for certain gas injection molding environments.

Figure 7:
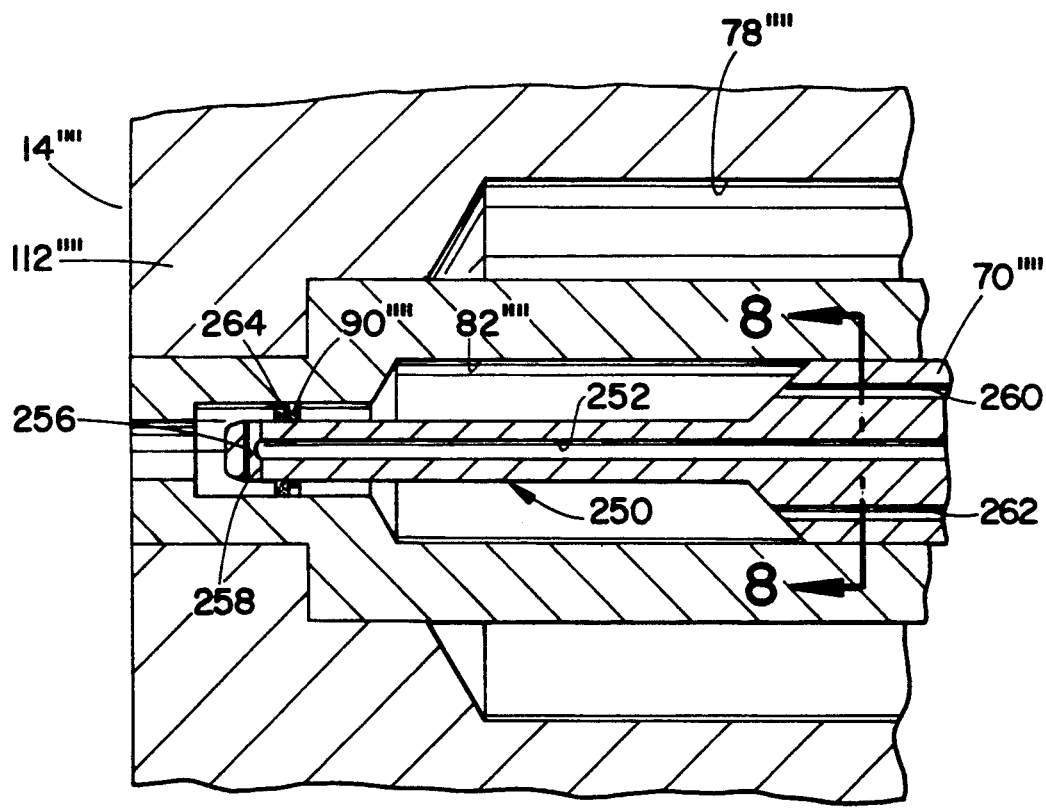
FIG. 7 is an enlarged cross-sectional view through a first end of a gas assisted injection molding apparatus according to an alternate embodiment of the present invention; and, FIG. 8 is a cross-sectional view of a probe of FIG. 7 along lines 8—8.
Figure 8:
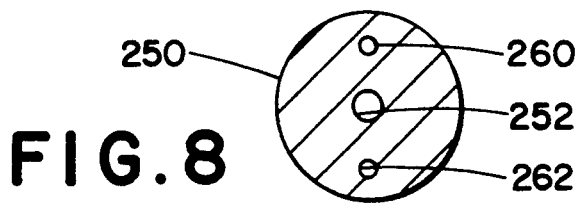

With reference now to FIGS. 7 and 8 an alternate embodiment of a pin is there illustrated. For ease of illustration and comprehension of this alternative, like components are identified by like numerals with a quadruple primed suffix (″″) and new components are identified by new numerals.

In this embodiment, a mold second half 12″″ includes a mold body aperture 78″″ through which extends a sleeve 70″″. The sleeve has a bore 82″″ in which reciprocates a pin 250. The pin has a longitudinally extending bore 252 which terminates adjacent a pin first end 254 in a cross bore 256 which leads to a pair of ports 258. Also extending longitudinally through the pin 250 are a pair of spaced bores 260 and 262 as perhaps best shown in FIG. 8. These bores 260 and 262 are utilized when venting the gas from the mold chamber 14″″. As is illustrated in FIG. 7, in this embodiment, the pin 250 is retracted far enough back into the sleeve 70″″ as to allow the fluid from the mold cavity 14″″ to flow around the pin first end 254 past a filter 264 adjacent a spider 90″″ and through the bores 260 and 262 during venting. This embodiment may be advantageous in order to decrease or lessen the possibility of the longitudinal bore 252 becoming clogged during venting of the gas with plastic particles which flake off the interior of the gas cavity created in the injection molded article held in the mold cavity 14″″.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. An apparatus for use in gas-assisted injection molding of plastic material so as to form an injection molded product, the apparatus comprising:
 a pair of mold members defining, when closed, a sealed cavity;
 a means for supplying a pressurized plastic material;
 a first opening provided in one of said mold members for allowing the injection of the plastic material into said cavity;
 a means for supplying a pressurized gas;
 a second opening provided in one of said mold members, for allowing the injection of the pressurized gas into said cavity;
 a probe located in said second opening and reciprocated therein from a retracted position to an extended position, said probe comprising:
  a first end, adapted to selectively extend into said cavity,
  a second end, and
  a first longitudinally extending bore which terminates in a port located adjacent said first end, said first bore being used to guide the gas into said cavity; and,
 a piston and cylinder construction for reciprocating said probe in relation to said cavity, said construction comprising a piston and a piston rod mounted for reciprocating movement in a cylinder, said probe being secured to an end of said piston rod, a second bore extending longitudinally through said piston rod and communicating with said first bore wherein said probe is connected to said means for supplying said pressurized gas so that said gas passes through said first and second bores of said probe when in said extended position.

2. The apparatus of claim 1 further comprising a microcomputer for controlling an operation of said piston and cylinder construction and said means for supplying gas.

3. The apparatus of claim 1 further comprising a pressure sensor for measuring a pressure in said mold cavity and a control mechanism, wherein said pressure sensor is also connected to said control mechanism.

4. The apparatus of claim 1 further comprising a temperature sensor for measuring a temperature in said mold cavity and a control mechanism, wherein said temperature sensor is also connected to said control mechanism.

5. The apparatus of claim 1 further comprising a sensor mounted on said cylinder for sensing a movement of said piston and a control mechanism, wherein said sensor is also connected to said control mechanism.

6. The apparatus of claim 1 further comprising a fastener for securing said cylinder to one of said pair of mold members.

7. The apparatus of claim 1 further comprising a means allowing adjustable positioning of said probe in relation to said sealed cavity.

8. An injection molding apparatus comprising:
a pair of mold members defining, when closed, a sealed cavity;
a means for supplying a pressurized viscous material;
a first opening provided in one of said mold members for allowing the injection of the viscous material into said cavity;
a second opening provided in one of said mold members, and spaced from said first opening;
a probe located in said second opening and reciprocated therein from a first retracted position to a second extended position, said probe comprising:
a first end, which selectively extends into said cavity when said probe is in said second position,
a second end, and
a longitudinally extending bore which terminates in a port adjacent said first end, said bore being selectively used, when said probe is in said second position, for the injection of a non-viscous fluid into said cavity and the subsequent venting of the fluid from the cavity;
a means for supplying the non-viscous fluid to said probe bore, said means for supplying the non-viscous fluid including a first valve for selectively allowing a flow of the non-viscous fluid to said probe bore;
a piston and cylinder construction for reciprocating said probe in said second opening in relation to said cavity; and,
a sensor mounted on said cylinder for sensing when said piston is in a predetermined position, wherein said means for supplying the non-viscous fluid is activated only after said piston is in said predetermined position.

9. The apparatus of claim 8 further comprising a sleeve located in said second opening and encircling said probe and wherein a port of said longitudinally extending bore extends out of said sleeve only when said probe is in said second position.

10. The apparatus of claim 8 further comprising a second valve for controlling a flow of a pressurized fluid to said cylinder to reciprocate said piston therein.

11. The apparatus of claim 8 wherein said piston and cylinder arrangement further comprises:
a piston rod on which said piston is secured; and,
a bore extending longitudinally through said piston rod and communicating with said probe longitudinally extending bore.

12. The apparatus of claim 11 further comprising:
a first seal element provided adjacent a first end of said cylinder; and,
a second seal element provided adjacent a second end of said cylinder.

13. The apparatus of claim 8 further comprising a fastener for securing said cylinder to one of said pair of mold members.

14. An apparatus for producing a fluid-assisted injection molded product of a viscous material, the apparatus comprising:
a mold space;
a means for supplying a pressurized viscous material;
a first passage opening into said mold space, for introducing the viscous material into said mold space;
a second passage opening into said mold space, and spaced from said first passage, for introducing a pressurized non-viscous fluid into the viscous material in said mold space so that a fluid cavity is formed in the viscous material;
a probe extending into said second passage and reciprocated therein, said probe comprising:
a first end including a port,
a second end, and
a longitudinally extending bore through which the non-viscous fluid is adapted to flow, said bore communicating with said port;
a means for supplying the pressurized non-viscous fluid to said mold space through said longitudinally extending bore in said probe;
a means for reciprocating said probe in said second passage wherein said means for reciprocating comprises:
a cylinder having an end wall,
a piston mounted for reciprocation in said cylinder,
a piston rod extending from at least one side of said piston out through said end wall of said cylinder, said probe being secured to said piston rod, and
a means for securing said cylinder end wall to a mold member which helps define said mold space; and,
a programmable means for controlling said means for supplying said non-viscous fluid and said means for reciprocating.

15. The apparatus of claim 14 further comprising a first valve for controlling a flow of the non-viscous fluid to said probe.

16. The apparatus of claim 14 further comprising a bore extending longitudinally through said piston rod and communicating with said probe longitudinally extending bore.

17. The apparatus of claim 14 wherein said programmable means for controlling comprises a microcomputer.

18. The apparatus of claim 14 further comprising a sleeve enclosing a portion of said probe, said sleeve having a first end and a second end, wherein said sleeve second end is provided with a flange having a larger diameter than a diameter of said second passage, so that said sleeve does not reciprocate in said second passage when said probe reciprocates.

19. The apparatus of claim 14 further comprising a sensor which senses a physical characteristic of the viscous material held in said mold cavity, said sensor being connected to said programmable means.

20. The apparatus of claim 14 wherein said cylinder further comprises a second end wall and said piston rod extends from both sides of said piston so that said piston rod also extends out said second end wall of said cylinder.

21. An apparatus for use in gas-assisted injection molding of plastic material so as to form an injection molded product, the apparatus comprising:
   a pair of mold members defining, when closed, a sealed cavity;
   a means for supplying a pressurized plastic material;
   a first opening provided in one of said mold members for allowing the injection of the plastic material into said cavity;
   a means for supplying a pressurized gas;
   a second opening provided in one of said mold members, for allowing the injection of the pressurized gas into said cavity;
   a probe located in said second opening and reciprocated therein from a retracted position to an extended position, said probe comprising:
      a first end, adapted to selectively extend into said cavity,
      a second end, and
      a first longitudinally extending bore which terminates in a port located adjacent said first end, said bore being used to channel the gas into said cavity;
   a means for reciprocating said probe in relation to said cavity, wherein said means for reciprocating comprises:
      a cylinder,
      a piston mounted for reciprocation in said cylinder,
      a piston rod extending from at least one side of said piston, wherein said probe is secured to said piston rod,
      a second bore extending longitudinally in said piston rod and communicating with said first bore, and
      a fastener for securing said cylinder to one of said mold members; and,
   a control means for controlling the operation of said means for reciprocating and said means for supplying the gas.

22. The apparatus of claim 21 wherein said control means comprises a microcomputer.

23. The apparatus of claim 21 further comprising a sensor which senses a physical characteristic of the pressurized plastic material held in said cavity, said sensor being connected to said control means.

24. The apparatus of claim 21 further comprising a sleeve located in said second opening and encircling said probe.

* * * * *